United States Patent
Zhang et al.

(10) Patent No.: US 12,222,850 B2
(45) Date of Patent: Feb. 11, 2025

(54) AUTOMATIC GENERATION OF CODE FUNCTION AND TEST CASE MAPPING

(71) Applicant: Dell Products L.P., Round Rock, TX (US)

(72) Inventors: Qin Zhang, Shanghai (CN); Jin Qin, Shanghai (CN); Jinghui Zhang, Shanghai (CN); Shuyu Zhao, Shanghai (CN); Xiaoxuan Dong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 92 days.

(21) Appl. No.: 17/740,756

(22) Filed: May 10, 2022

(65) Prior Publication Data
US 2023/0333969 A1    Oct. 19, 2023

(30) Foreign Application Priority Data

Apr. 15, 2022 (CN) .......................... 202210401144.2

(51) Int. Cl.
G06F 11/36    (2006.01)

(52) U.S. Cl.
CPC ...... *G06F 11/3688* (2013.01); *G06F 11/3636* (2013.01); *G06F 11/3684* (2013.01); *G06F 11/3696* (2013.01)

(58) Field of Classification Search
CPC .......................................... G06F 11/3676–3692
USPC ........................................................... 717/124
See application file for complete search history.

(56) References Cited

U.S. PATENT DOCUMENTS

| | | | | |
|---|---|---|---|---|
| 6,536,036 B1* | 3/2003 | Pavela | ............... | G06F 11/3676 717/125 |
| 7,836,346 B1* | 11/2010 | Davidov | ............. | G06F 11/3692 717/124 |
| 10,657,099 B1 | 5/2020 | Vona et al. | | |
| 2004/0250191 A1* | 12/2004 | Leaming | ............ | G06K 7/10465 714/742 |
| 2009/0276663 A1* | 11/2009 | Kaksonen | ............. | G06F 11/263 714/25 |
| 2016/0085663 A1* | 3/2016 | Best | ................... | G06F 11/3684 714/38.1 |
| 2019/0340113 A1 | 11/2019 | Earanti et al. | | |
| 2020/0117583 A1 | 4/2020 | Durairaj | | |
| 2021/0209010 A1 | 7/2021 | Durairaj et al. | | |

(Continued)

FOREIGN PATENT DOCUMENTS

WO    WO-9612224 A1 *    4/1996    .......... G06F 11/3684

OTHER PUBLICATIONS

Anu, Han, et al., An Approach to Recommendation of Verbosity Log Levels Based on Logging Intention, IEEE International Conference on Software Maintenance and Evolution (ICSME), 2019, 10 pages, [retrieved on Sep. 26, 2024], Retrieved from the Internet: <URL:http://ieeexplore.ieee.org/>.*

(Continued)

*Primary Examiner* — Geoffrey R St Leger
(74) *Attorney, Agent, or Firm* — Larson Newman, LLP

(57) ABSTRACT

An information handling system executes test cases against a code that includes a set of functions, wherein the execution is performed at least twice using a different trace switch value. The system also identifies trace logs associated with each test case, and maps each test case to one or more functions based on the association of the trace logs with each test case.

20 Claims, 4 Drawing Sheets

(56) References Cited

U.S. PATENT DOCUMENTS

2021/0232491 A1 7/2021 Yuan et al.

OTHER PUBLICATIONS

Chen, Boyuan, et al., An Automated Approach to Estimating Code Coverage Measures via Execution Logs, ASE '18: Proceedings of the 33rd ACM/IEEE International Conference on Automated Software Engineering, 2018, 12 pages, [retrieved on Sep. 26, 2024], Retrieved from the Internet: < URL:http://dl.acm.org/>.*

* cited by examiner

AUTOMATIC GENERATION OF CODE FUNCTION AND TEST CASE MAPPING

FIELD OF THE DISCLOSURE

The present disclosure generally relates to information handling systems, and more particularly relates to automatic generation of code function and test case mapping.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system executes test cases against a code that includes a set of functions, wherein the execution is performed at least twice using a different trace switch value. The system also identifies trace logs associated with each test case, and maps each test case to one or more functions based on the association of the trace logs with each test case.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
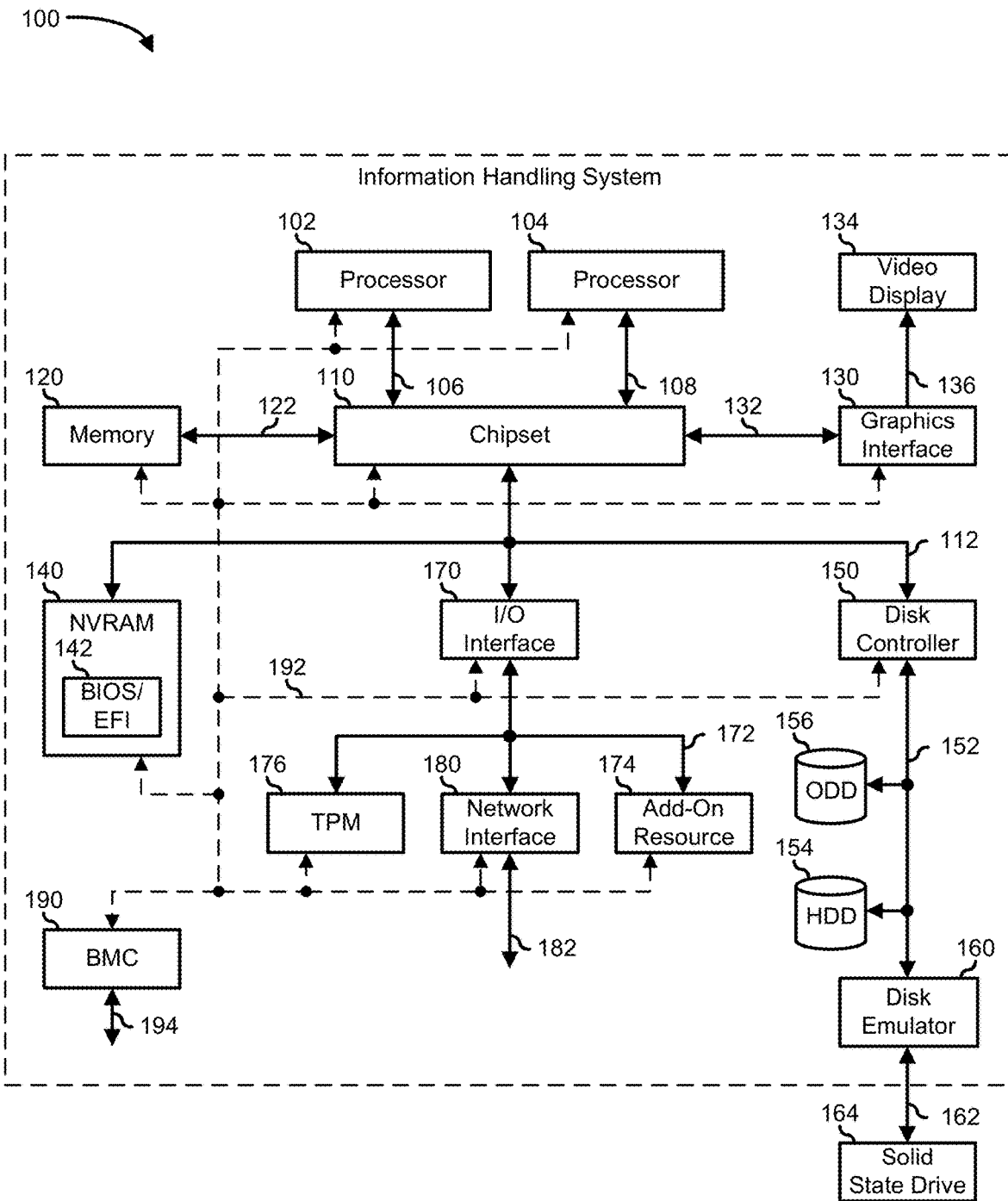
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out-of-band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Regression tests are important to determine whether a code change has adversely affected existing functions or features. Typically regression test cases are run every time there is a code change, wherein test cases are run from a test case pool and include most if not all of the functional test cases. However because regression test cases include a lot of test cases, running the regression test takes a long time to complete. The running of most if not all of the test cases is typical because the mapping between test cases and code functions is fuzzy if it exists. Thus, to increase the efficiency of regression tests, the ability to selectively run tests that are related to and/or affected by changes to particular code functions is desirable.

In addition, for embedded systems an external debug equipment is usually needed to determine whether a function is covered by a test case due to current limitations. As such, determining code coverage of firmware code associated with embedded systems is at least cumbersome if not technically challenging. Also, typical tools used to determine code coverage provide unnecessary data that a tester/developer has to manage. Thus, it is also desirable to have code coverage information without the need for external debug equipment and only include relevant information.

Accordingly, it is desirable to address the aforementioned issues. The present disclosure provides a system and method to automatically generate a code function and test case mapping a mapping. The mapping may be generated by repeatedly randomly sampling trace logs. This improves the technological field of software testing by increasing the efficiency of testing firmware and/or software code. Another technical advantage of the present disclosure is the removal of the dependency to the external debug equipment in testing code for embedded systems. In addition, the present disclosure provides an improvement in the utilization of test results, wherein the test logs are used to generate a mapping of the test cases to the code functions instead of or in addition to the typical use of the test logs which is to determine causes of test case failures.

Figure 2:
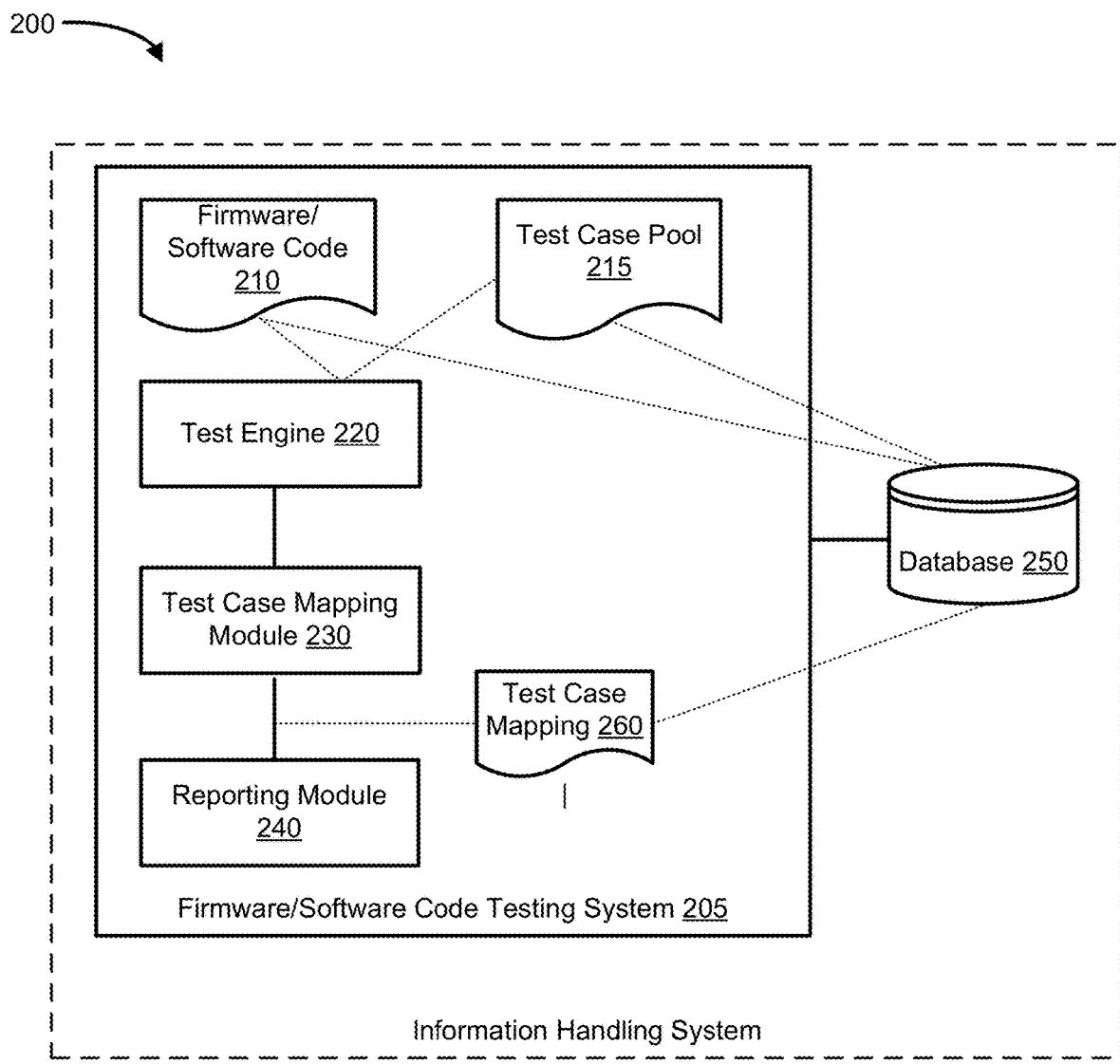
FIG. 2 is a block diagram illustrating an example of a system for automatic generation of code function and test case mapping, according to an embodiment of the present disclosure.

FIG. 2 shows an information handling system 200 with a firmware/software code testing system 205 for automatic generation of code function and test case mapping. In an embodiment, firmware/software code testing system 205, also referred to as code testing system 205, may be provided by information handling system 200 which is similar to information handling system 100 of FIG. 1. Code testing system 205 may include a test engine 220, a test case mapping module 230, a reporting module 240, and a database 250. Information handling system 200 may include some or all of the components of information handling system 100. Although components of code testing system 205 are provided by one information handling system, in another embodiment, the components of code testing system 205 may be provided by more than one information handling system which may be implemented in a local system or a network-connected environment. The components of code testing system 205 may be implemented in hardware, software, firmware, or any combination thereof. Also, the components shown are not drawn to scale, and code testing system 205 may include additional or fewer components. In addition, connections between components may be omitted for descriptive clarity.

Test engine 220, also referred to as a test execution engine, may be configured to perform a code structure analysis of firmware/software code 210, also referred to as code 210. In one example, code 210 may be firmware code associated with an embedded system of information handling system 100. In another example, code 210 may be software code such as an application running on information handling system 100. The code structure analysis may determine the functions associated with code 210. For example, the code structure analysis may output a graph that shows the relationship between the functions. In addition, the code structure analysis may also identify each trace log associated with the functions and generate a code function mapping similar to code function mapping 310 of FIG. 3.

After the code structure analysis, test engine 220 may perform test case training, wherein test engine 220 may execute a sampling of test cases by running the test cases at least twice. For example, test engine 220 may run test cases in a test case pool 215 against code 210. Each test case may test or exercise one or more functions in code 210. For example, the test case may be executed by referencing the test case using a test name. In one example, test case pool 215 and code 210 may both be stored in database 250 or similar. Database 250 may be configured in a storage device such as HDD 154 and SSD 164 of FIG. 1. Each of the test cases may be executed using different trace switch values. A trace switch allows the tester to enable, disable, and filter tracing output based on a tracing level. Each function may be associated with a trace switch or tracing level that is different from another function. In another embodiment, a set of test cases may be run using the same trace switch value once and a different trace switch value a second time. The trace switch value may be increasing or decreasing based on the desired level of granularity of the log messages.

Test case mapping module 230 may be configured to generate test case mapping 260 based on the results of each test execution. Test case mapping 260 is a mapping of a test case to one or more functions of code 210. Code 210 may be firmware of an embedded system or hardware device of information handling system 200. Code 210 may also be software code such as an application. Test case mapping 260 may be transmitted to reporting module 240 for further processing and/or display at a user interface. Reporting module 240 may be configured to generate a test report that indicates the results of one or more execution of the test case(s) in test case pool 215. For example, the test report may include a test case and code function mapping as indicated in test case mapping 330n of FIG. 3, wherein test case mapping 330 may also be referred to as a final test case mapping. The test report may be displayed at a user interface for real-time monitoring and analysis of the results of test case execution and test case to code function mapping.

In another example, reporting module 240 may be configured to generate a code coverage report that identifies the coverage of the functions of code 210. For example, the code coverage report may provide a list of the functions that are covered by the test cases. The code coverage may also provide another list of the code functions that are not covered by the test cases. Based on the aforementioned, a percentage of the code functions that are covered by the test cases may be determined. However, one skill in the art may appreciate that test case mapping and code coverage may be reported in a variety of ways that will fall within the specific disclosure.

Those of ordinary skill in the art will appreciate that the configuration, hardware, and/or software components of information handling system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
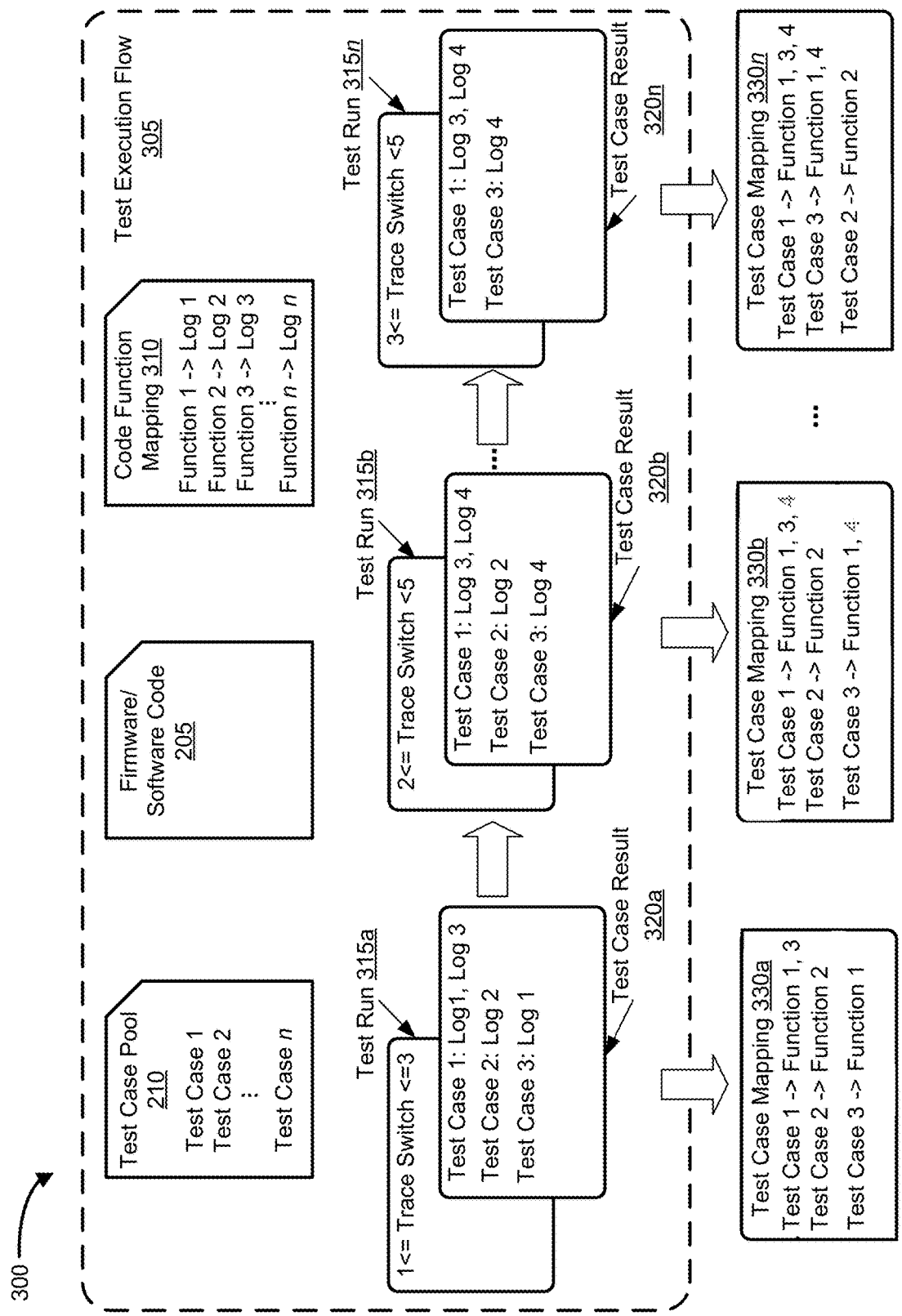
FIG. 3 is a diagram illustrating an example of a sequence for automatic generation of code function and test case mapping, according to an embodiment of the present disclosure.

FIG. 3 shows a schematic diagram of a mapping sequence 300 for building a code function and test case mapping dataset. Mapping sequence 300 includes a test execution flow 305 using test case pool 215, code 210, and a code function mapping 310. In this example, one or more test cases in test case pool 215 are executed repeatedly at 77 times against code 210 for random sampling of trace logs. Each test run may be associated with a different trace switch value or log level, such as shown in test runs 315a, 315b-315n resulting in test case results 320a-320n. In test run 315a, the trace switch was set to less than or equal to one and less than or equal to three. In test run 315b, the trace switch is set to less than or equal to two and less than five. In test run 315n, the trace switch is set to less than or equal to three and less than five. In another example, the trace switch associated with a log level may be set to a particular value or setting, such that the value of the trace switch may be set to "1" or "debug." Generally, log levels control the category and granularity of detail of the information that is included in a log message. In addition, the number of log messages may vary with each log level. For example, when test run 315a is run, test case one generated logs one and three as shown in test result 320a. When test run 315b is run with a different value for the trace switch, test case one generated logs one, three, and four as shown in test case result 320b. Accordingly, test run 315b generated an additional log four from test run 315a.

A test case mapping module may be configured to determine the mapping of test cases to code functions based on the test case results and code function mapping 310 which includes mapping of code functions to one or more logs, such as test case mappings 330a-330n. Test case mapping module 230 of FIG. 2 may parse the test case result 320a and code function mapping 310 to generate datasets that show test case mappings to code functions such as test case mapping 330a. For example, because log one is associated with function one and log three is associated with function three, the test case mapping module may map test case one to functions one and three. The test case mapping module may perform similar mapping for the other functions with the other test runs. In addition, the test case mapping module may aggregate the results of the test case mappings to a final test case mapping for that set of test runs. For example, test case mapping 330*b*, which is a current mapping based on test case result 320*b*, shows that test case one is mapped to functions one, three, and four in contrast with test case mapping 330*a*, which is a previous mapping based on test case result 320*a* that shows test case one is mapped to functions one and three. In this scenario, test case one is mapped to a function that is different from the previous mapping. Accordingly, test case mapping 330*n* which is a final test case mapping for this set of test runs is an aggregation of test case mapping 330*a* and test case mapping 330*b*, wherein test case one is mapped to functions one, three, and four.

The datasets may be used to generate a test suite that includes a subset of the test cases in a test pool, wherein the test suite may provide the desired level of code coverage using a minimum number of test cases thereby providing more efficient and less time-consuming execution of regression test cases. For example, if there is a change to the function one, a regression test to test the change may include test case 1 instead of test cases one and three or all of the test cases. Thus, the regression test is more efficient. The datasets may also be used to dynamically rebuild another dataset that adapts to code changes. For example, when the code changes are made to code 210, such that a new function is added, another set of test execution with different trace switches may be performed. In another example, only test cases associated with the new function may be determined and executed.

Figure 4:
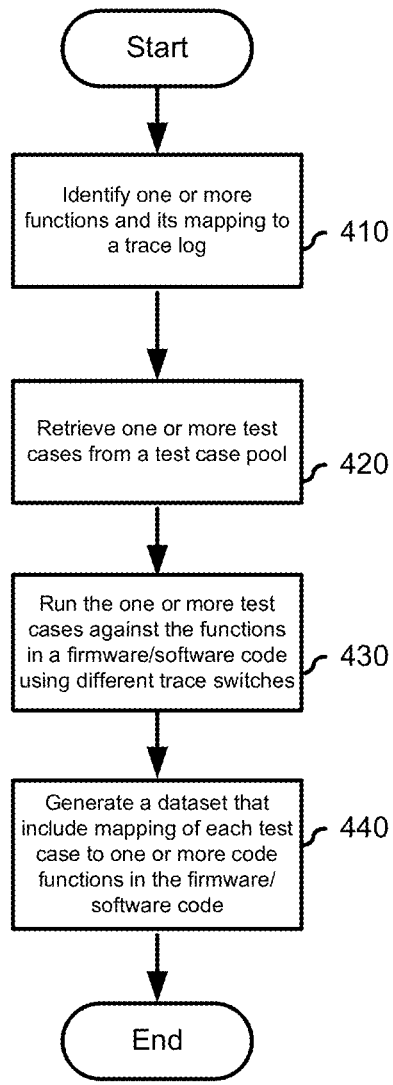
FIG. 4 is a flowchart illustrating an example of a method for automatic generation of code function and test case mapping, according to an embodiment of the present disclosure.

FIG. 4 illustrates a method 400 for automatic generation of code function and test case mapping. Method 400 may be performed by one or more components of code testing system 205 such as test engine 220, test case mapping module 230, and reporting module 240 of FIG. 2. However, while embodiments of the present disclosure are described in terms of code testing system 205 of FIG. 2, it should be recognized that other systems may be utilized to perform the described method. One of skill in the art will appreciate that this flowchart explains a typical example, which can be extended to advanced applications or services in practice.

Method 400 typically starts at block 410, where a firmware or software code for is identified. In addition, the method may also identify a set of functions in the firmware or software code including a mapping of each of the functions to a trace log, such as code function mapping 310 of FIG. 3. At block 420, the method retrieves one or more test cases from a test case pool. For example, a plurality of test cases may be available for testing the plurality of functions of the firmware/software code. In particular, each test case may be used to test one or more functions.

At block 430, the method, or the test engine, in particular, may execute one or more test cases against the firmware/software code. The test cases may be executed repeatedly to randomly sample trace logs. In particular, the test cases may be executed at least twice with a different trace switch for each execution. For example, the value of the trace switch may increase with each execution resulting in more verbose messages in the logs. This would generate one or more test case results, such that each test case result includes a plurality of logs. Each test case may generate one or more logs based on the function that is tested or exercised. A mapping of test cases to test logs may be determined based on the test results. The test case mapping to one or more logs may be selected based on the function names identified in the logs.

At block 440, the method, or a test case mapping module, in particular, may generate a dataset that includes a mapping of each test case to at least one function code. The dataset may be generated from each of the test case results. The dataset may be an aggregate of the current and previous mapping of each test case to one or more functions. A test case that is mapped to a particular function may be said to perform code coverage of that function. As such a test case may provide code coverage to one or more functions. Accordingly, one or more test cases may provide code coverage to the same function(s). The dataset may be used to generate a test suite that includes a subset of test cases that provide the desired level of software code coverage of the functions in the firmware/software code and production code robustness. For example, the method may generate a test suite that covers a maximum number of functions using a minimum number of test cases. This means that the tester does not need to run all the test cases in the test case pool to run regression testing against the firmware/software code resulting in more efficient regression testing.

In addition, the method may determine whether there are functions not covered in the test suites. For example, the method may determine that one or more trace logs are missing from the test case result and generate a dataset and/or report that identifies the functions associated with the missing logs. Based on this dataset and/or report additional test cases may be written to increase code coverage. In another example, a test suite may be dynamically created based on the name of the functions associated with failed test cases. As such, after the code has been fixed the test suite may be run against those test cases that failed instead of running the whole test suite.

In yet another embodiment, the code function and test case mapping dataset may be generated in a test environment and a production environment. The method may compare the dataset to determine if there is a delta between the two datasets. If a delta exists, then the method may provide information on which function is in one dataset but not in the other. Accordingly, a decision may be made on how to address the delta such as whether to refactor the function or not.

Although FIG. 4 shows example blocks of method 400 in some implementation, method 400 may include additional blocks, fewer blocks, different blocks, or differently arranged blocks than those depicted in FIG. 4. Those skilled in the art will understand that the principles presented herein may be implemented in any suitably arranged processing system. Additionally, or alternatively, two or more of the blocks of method 400 may be performed in parallel. For example, block 410 and block 420 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   executing, by a processor, a plurality of test cases against a code that includes a plurality of functions, wherein the executing of the test cases against the code is performed at least twice generating trace logs, wherein each of the executing of the test cases is performed a first time using a first trace switch value and a second time using a second trace switch value, and wherein the first trace switch value is different from the second trace switch value, wherein the executing of the test cases the first time is associated with a first set of functions, wherein the executing of the test cases the second time is associated with a second set of functions, and wherein the first set of functions is different than the second set of functions;
   identifying the trace logs associated with each of the executing of the test cases;
   generating a mapping of each test case of the test cases to at least one function of the plurality of functions based on association of the trace logs with each test case by randomly sampling the trace logs; and
   generating a code coverage report that provides a first list of functions covered by the test cases and a second list of functions that are not covered by the test cases.

2. The method of claim 1, further comprising identifying the plurality of functions associated with the code.

3. The method of claim 1, wherein the code is a firmware associated with an embedded system.

4. The method of claim 1, wherein the code is a software code.

5. The method of claim 1, wherein each of the plurality of functions is associated with a trace log.

6. The method of claim 1, further comprising generating another mapping of each test case to one or more trace logs.

7. The method of claim 1, further comprising aggregating the mapping of each test case to the at least one function with a previous mapping of each test case to at least another function, resulting in an aggregated mapping of each test case to both functions.

8. An information handling system, comprising:
   a memory; and
   a processor associated with the memory and configured to:
      execute a plurality of test cases against a code that includes a plurality of functions, wherein the execution is performed at least twice generating trace logs, wherein each of the executions is performed a first time using a first trace switch value and a second time using a second trace switch value, and wherein the first trace switch value used the first time is different than the second trace switch value used the second time, wherein the executing of the test cases the first time is associated with a first set of functions, wherein the executing of the test cases the second time is associated with a second set of functions, and wherein the first set of functions is different than the second set of functions;
      identify the trace logs associated with each execution of the test cases;
      generate a mapping of each test case of the test cases to one or more of the plurality of functions based on association of the trace logs with each test case by randomly sampling the trace logs; and
      generate a code coverage report that provides a first list of functions covered by the test cases and a second list of functions that are not covered by the test cases.

9. The information handling system of claim 8, the processor further configured to identify the plurality of functions.

10. The information handling system of claim 8, wherein the code is firmware associated with an embedded system.

11. The information handling system of claim 8, wherein the code is a software code.

12. The information handling system of claim 8, wherein each of the functions of the plurality of functions is associated with a trace log.

13. The information handling system of claim 8, the processor further configured to generate another mapping of each test case to one or more trace logs.

14. The information handling system of claim 8, wherein a current mapping of each test case to the one or more functions includes an aggregation of a previous mapping of each test case to the one or more functions that was generated in a previous execution of the test cases.

15. A non-transitory computer-readable media to store instructions that are executable to perform operations comprising:

executing a plurality of test cases against a code that includes a plurality of functions, wherein the executing of the test cases against the code is performed at least twice generating trace logs, wherein each executing is performed a first time using a first trace switch value and a second time using a second trace switch value, and wherein the first trace switch value used the first time is different than the second trace switch value used the second time, wherein the executing of the test cases the first time is associated with a first set of functions, wherein the executing of the test cases the second time is associated with a second set of functions, and wherein the first set of functions is different than the second set of functions;

identifying the trace logs associated with each of the executing of the test cases;

mapping each test case of the test cases to one or more functions based on association of the trace logs with each test case by randomly sampling the trace logs; and generating a code coverage report that provides a first list of functions covered by the test cases and a second list of functions that are not covered by the test cases.

16. The non-transitory computer-readable media of claim 15, wherein the operations further comprise identifying each of the plurality of functions associated with the code.

17. The non-transitory computer-readable media of claim 15, wherein the code is firmware associated with an embedded system.

18. The non-transitory computer-readable media of claim 15, wherein the code is a software code.

19. The non-transitory computer-readable media of claim 15, wherein each of the plurality of functions is associated with a trace log.

20. The non-transitory computer-readable media of claim 15, wherein the operations further comprise aggregating the mapping of each test case to at least one function with a previous mapping of each test case to at least one different function.

* * * * *